(12) United States Patent
Tran et al.

(10) Patent No.: US 7,038,878 B2
(45) Date of Patent: May 2, 2006

(54) MICROMOVER CONFIGURED TO MOVE A MAGNETIC STORAGE MEDIUM IN PERPENDICULAR DIRECTIONS IN A PLANE

(75) Inventors: Lung T. Tran, Saratoga, CA (US); Andrew Van Brocklin, Corvallis, OR (US); Kenneth James Eldredge, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 255 days.

(21) Appl. No.: 10/695,567

(22) Filed: Oct. 28, 2003

(65) Prior Publication Data

US 2005/0088873 A1    Apr. 28, 2005

(51) Int. Cl.
*G11B 5/00* (2006.01)
*G11B 5/29* (2006.01)
*G11B 17/02* (2006.01)

(52) U.S. Cl. .................... 360/88; 360/2; 360/99.09; 360/121

(58) Field of Classification Search .................. None
See application file for complete search history.

(56) References Cited

U.S. PATENT DOCUMENTS

| | | | | |
|---|---|---|---|---|
| 4,571,646 A | * | 2/1986 | Bauck et al. | 360/99.09 |
| 5,331,491 A | * | 7/1994 | Hayakawa et al. | 360/110 |
| 5,557,596 A | | 9/1996 | Gibson et al. | 369/101 |
| 5,621,583 A | * | 4/1997 | Parks et al. | 360/81 |
| 5,650,958 A | | 7/1997 | Gallagher et al. | 365/173 |
| 5,703,733 A | * | 12/1997 | Suzuki et al. | 360/77.01 |
| 6,211,673 B1 | * | 4/2001 | Gerber et al. | 324/262 |
| 6,356,406 B1 | * | 3/2002 | Takano et al. | 360/81 |

(Continued)

OTHER PUBLICATIONS

"The Future of Probe Storage: Summary of the Connexions Workshop" by James A. Bain, The conference was entitled The Future of Probe Storage: Summary of the Connexions Workshop and was held Nov. 7, 2003 by the Center of Highly Integrated Information Processing and Storage Systems at Carnegie Mellon University.(www.chips.ece.cm-u.edu).

(Continued)

*Primary Examiner*—Jefferson Evans

(57) ABSTRACT

A storage device comprising a magnetic storage medium mounted in a first plane, a read and write mechanism mounted in a second plane that is parallel to the first plane and configured to write information to the magnetic storage medium, and a micromover configured to move the magnetic storage medium in a first direction parallel to the first plane and configured to move the magnetic storage medium in a second direction parallel to the first plane and perpendicular to the first direction.

24 Claims, 5 Drawing Sheets

U.S. PATENT DOCUMENTS

| | | | |
|---|---|---|---|
| 6,411,589 B1 * | 6/2002 | Hoen et al. | 369/126 |
| 6,504,665 B1 * | 1/2003 | Mukasa et al. | 360/55 |
| 6,532,204 B1 * | 3/2003 | Halliday et al. | 720/698 |
| 6,574,071 B1 * | 6/2003 | Nelson et al. | 360/99.04 |
| 6,587,408 B1 * | 7/2003 | Jacobson et al. | 369/44.16 |
| RE38,290 E * | 10/2003 | Rose | 360/131 |
| 6,728,059 B1 * | 4/2004 | Liu et al. | 360/75 |

OTHER PUBLICATIONS

"An Overview of MEMS Probe Storage" by L. Richard Carley, pp. 1-22. The conference was entitled The Future of Probe Storage: Summary of the Connexions Workshop held Nov. 7, 2002 by the Center of Highly Integrated Information Processing and Storage Systems at Carnegie Mellon University .(www.chips.ece.cmu.edu).

* cited by examiner

MICROMOVER CONFIGURED TO MOVE A MAGNETIC STORAGE MEDIUM IN PERPENDICULAR DIRECTIONS IN A PLANE

BACKGROUND OF THE INVENTION

For decades, researchers have been trying to increase the storage density and reliability as well as reduce the cost of storage devices such as hard disk drives.

Hard disk drives typically include one or more magnetic media attached to a spindle. A motor turns the spindle at high speeds to cause the media to move relative to one or more read and write heads. As a result, the read and write heads move rapidly across the media at a close distance and at a relatively high speed. The close distance and high speed cause the aerodynamics of the system to become design issues.

The motor of a hard disk drive may require a relatively large amount of power to spin. In addition, any deviation from a set distance between the read and write heads and the media may cause a hard disk drive to malfunction or cause the read or write heads to collide with the media. Accordingly, the power consumption and the possibility of a physical malfunction associated with hard disk drives leave room for improvement.

SUMMARY OF THE INVENTION

One exemplary embodiment of the present disclosure provides a storage device comprising a magnetic storage medium mounted in a first plane, a read and write mechanism mounted in a second plane that is parallel to the first plane and configured to write information to the magnetic storage medium, and a micromover configured to move the magnetic storage medium in a first direction parallel to the first plane and configured to move the magnetic storage medium in a second direction parallel to the first plane and perpendicular to the first direction.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION

Figure 1:
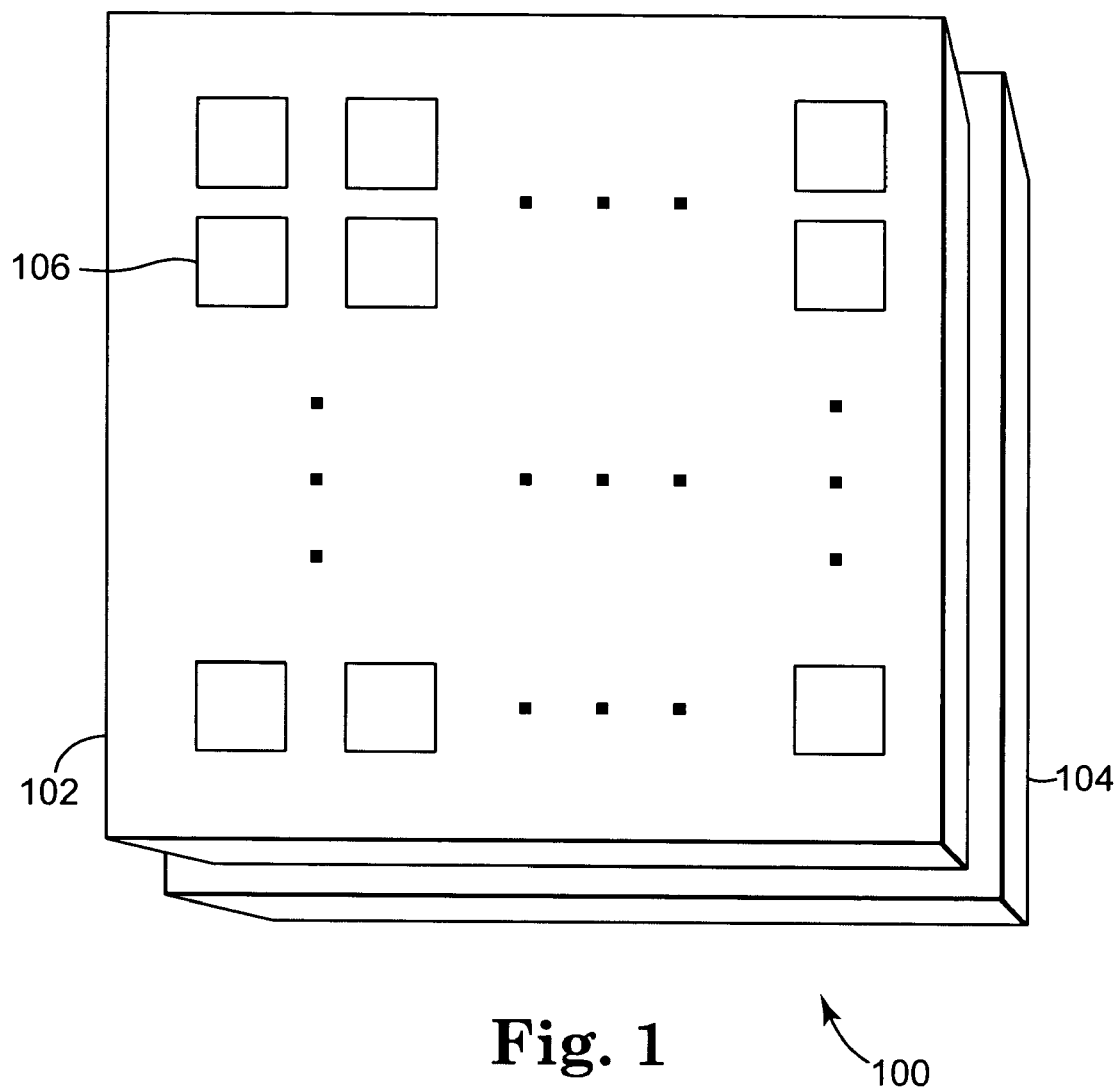
FIG. 1 is a diagram illustrating an embodiment of storage device that includes a micromover.

FIG. 1 is a diagram illustrating an embodiment of storage device 100 that includes a micromover 104. Storage device 100 includes a read/write mechanism array 102, micromover 104, and a casing (not shown in FIG. 1) for housing read/write mechanism array 102 and micromover 104.

Read/write mechanism array 102 includes a plurality of read/write mechanisms 106 mounted in a housing in a first plane in the casing. Read/write mechanisms 106 are arranged in rows and columns within read/write mechanism array 102. Read/write mechanisms 106 each include preamplifiers and other associated electronic circuitry configured to cause information to be read from and written to a magnetic storage medium.

Micromover 104 is mounted in a housing in a second plane in the casing. The second plane is parallel to the first plane that includes read/write mechanisms 106. Micromover 104 is configured to move a magnetic storage medium relative to read/write mechanism array 102. In particular, micromover 104 moves the magnetic storage medium in directions that are parallel to the first plane that includes read/write mechanisms 106.

Read/write mechanism array 102 is mounted in the casing in close proximity to the magnetic storage medium mounted in micromover 104. In one embodiment, read/write mechanism array 102 is mounted approximately 0.25 microns or 1 micro-inch or less from the magnetic storage medium.

Figure 2:
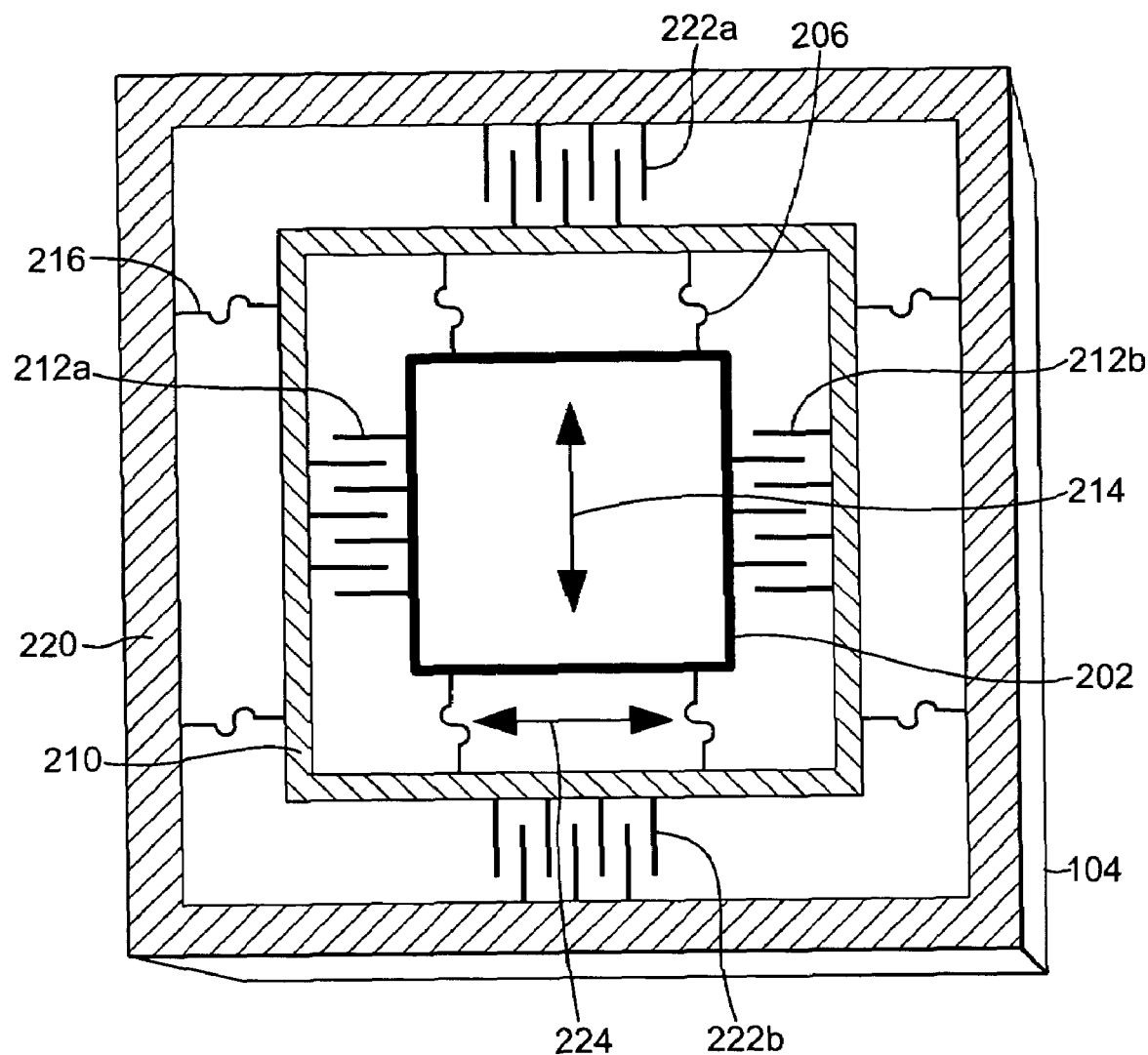
FIG. 2 is a diagram illustrating selected portions of the embodiment of the storage device of FIG. 1.

FIG. 2 illustrates additional details of micromover 104. In the embodiment shown in FIG. 2, micromover 104 includes a magnetic storage medium 202, frame support elements 204, a frame 210, a first set of electrostatic movers 212a and 212b, frame support elements 216, a frame 220, and a second set of electrostatic movers 222a and 222b.

Movers 212a and 212b move magnetic storage medium 202 in a first direction that is parallel to the first plane that includes read/write mechanisms 106 as indicated by an arrow 214. Movers 222a and 222b move magnetic storage medium 202 in a second direction that is parallel to the first plane that includes read/write mechanisms 106 and perpendicular to the first direction as indicated by an arrow 224.

By moving magnetic storage medium 202 relative to the first plane that includes read/write mechanisms 106, micromover 104 allows each read/write mechanisms 106 to read from and write to a designated storage area on magnetic storage medium 202. The storage areas form an array of storage areas on magnetic storage medium 202 such that each storage area is read to and written from a corresponding read/write mechanisms 106. Each storage area includes a number of storage locations. Each storage location is configured to store one bit of information.

Figure 3A:
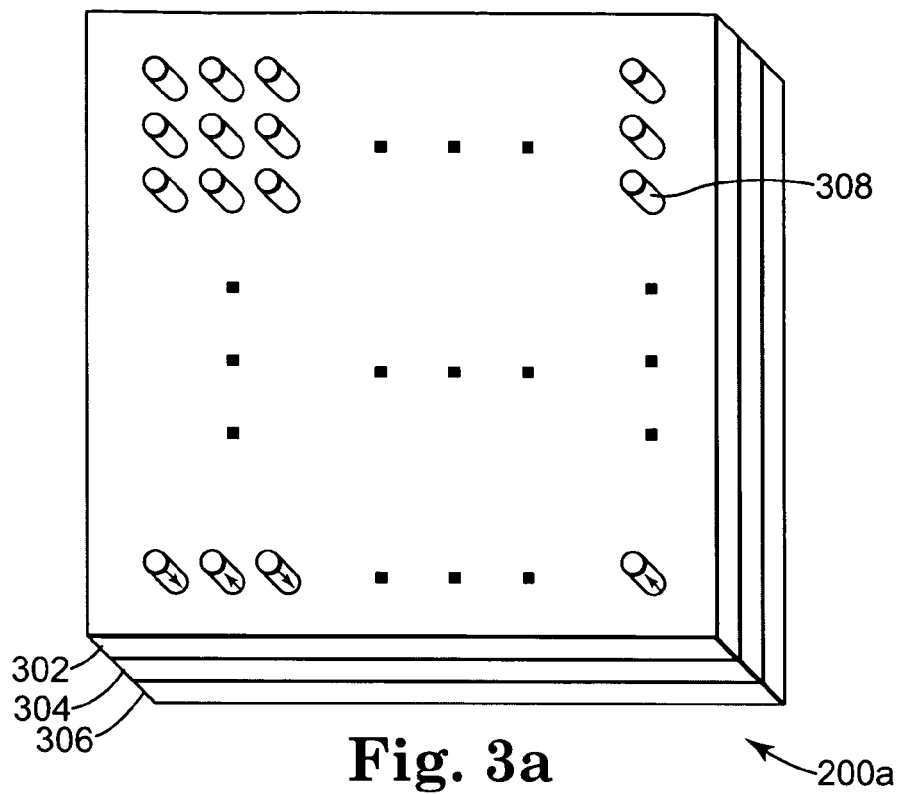
FIG. 3a is a diagram illustrating a first embodiment of a magnetic storage medium.
Figure 3B:
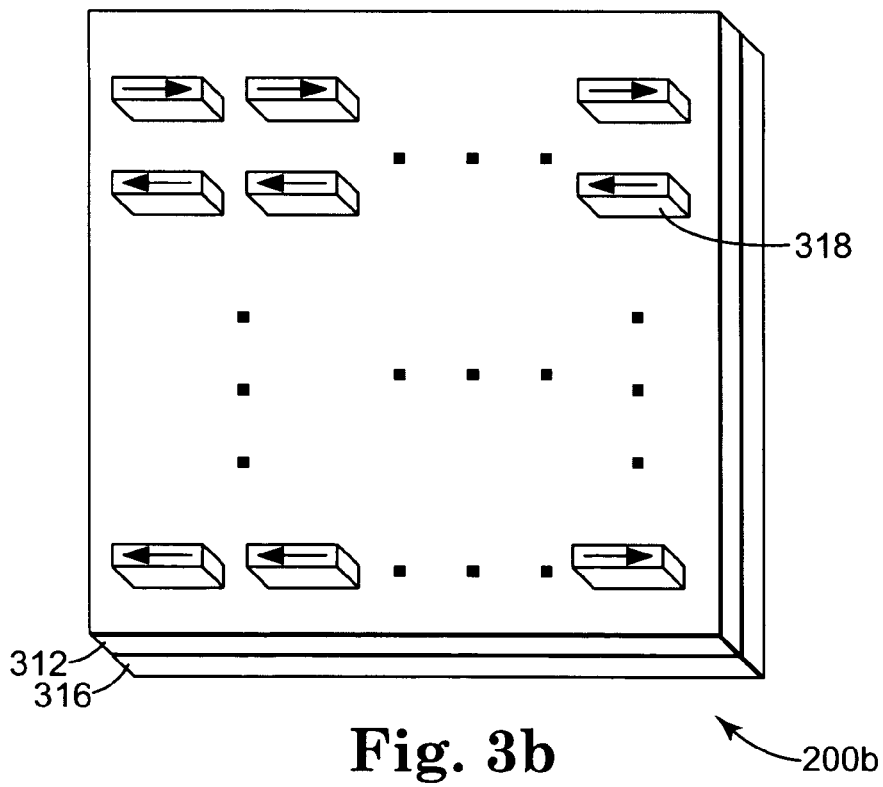
FIG. 3b is a diagram illustrating a second embodiment of a magnetic storage medium.

FIGS. 3a and 3b illustrate first and second embodiments of magnetic storage medium 200a and 200b.

In FIG. 3a, magnetic storage medium 200a includes a data layer 302 and a magnetically soft layer 304 that are mounted on a substrate 306. Magnetic storage medium 200a comprises a perpendicular medium. A perpendicular medium is a medium where a logic state, i.e., a logic one or a logic zero, of each storage location 308 is determined according the orientation of magnetization in the storage location 308 in a direction perpendicular to the plane of magnetic storage medium 200a.

In FIG. 3b, magnetic storage medium 200b includes a data layer 312 mounted on a substrate 316. Magnetic storage medium 200a comprises a longitudinal medium. A longitudinal medium is a medium where a logic state, i.e., a logic one or a logic zero, of each storage location 318 is determined according the orientation of magnetization in the storage location 318 in a direction parallel to the plane of magnetic storage medium 200a.

Figure 4A:
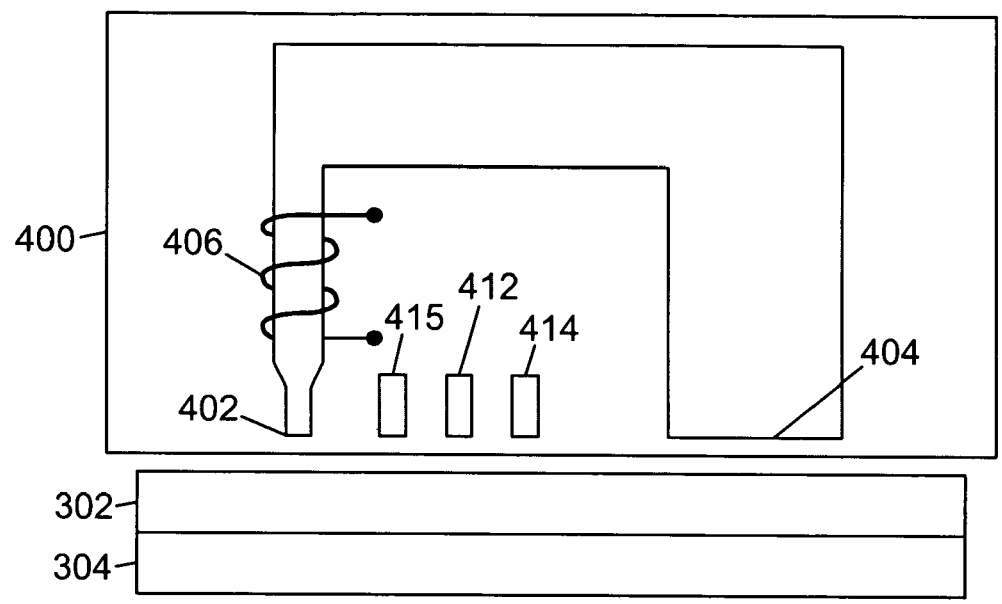
FIG. 4a is a diagram illustrating a first embodiment of a read/write mechanism shown from a first perspective.
Figure 4B:
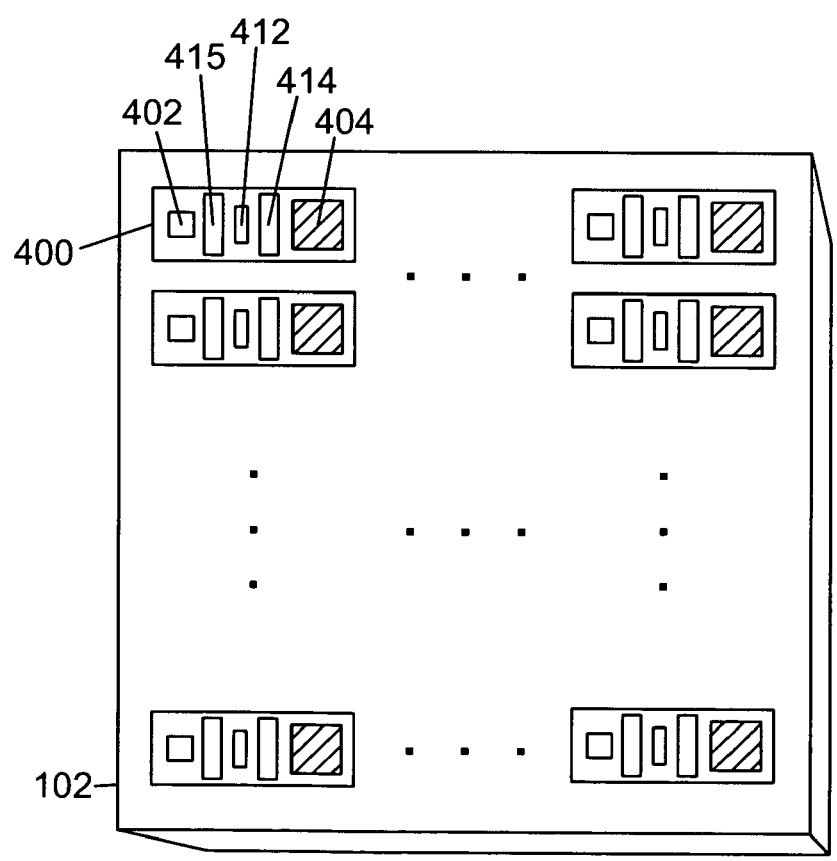
FIG. 4b is a diagram illustrating of a first embodiment of a read/write mechanism shown from a second perspective.

FIGS. 4a and 4b illustrate a first embodiment of read/write mechanism 106 for use with the perpendicular magnetic storage medium 200a shown in FIG. 3a. In this embodiment, read/write mechanism 106 includes read/write device 400. Read/write device 400 includes a write pole 402, a magnetic flux return pole 404, a coil 406 that produces magnetic flux in write pole 402 when energized, a read sensor 412, and a shield pair 414 and 415.

To write information using read/write device 400, a directional current is applied to coil 406 to cause magnetic flux to flow across probe write head 402. Probe write head 402 causes information to be stored in data layer 302 according to the direction of the flux. The application of current to coil 406 in a one direction causes a first logic state to be stored in data layer 302, and the application of current to coil 406 in the other direction causes a second logic state to be stored in data layer 302.

Read sensor 412 causes information to be read from data layer 302. Read sensor 412 may be a magnetoresistive (MR) sensor, a giant magnetoresistive (GMR) sensor, or a magnetic tunnel junction sensor. In a magnetoresistive sensor, the magnetic orientation in a sensing layer changes in response to the sensor passing over a magnetic bit in a medium. A giant magnetoresistive sensor includes multiple metallic layers such as a pinned layer, a free layer, and a spacer and detects changes in the magnetic orientation in the free layer in response to the sensor passing over a magnetic bit in a medium.

Shield 414 surrounds read sensor 412 as illustrated in FIG. 4b that shows rows and columns of read/write devices 400 in read/write mechanism array 102.

Figure 5:
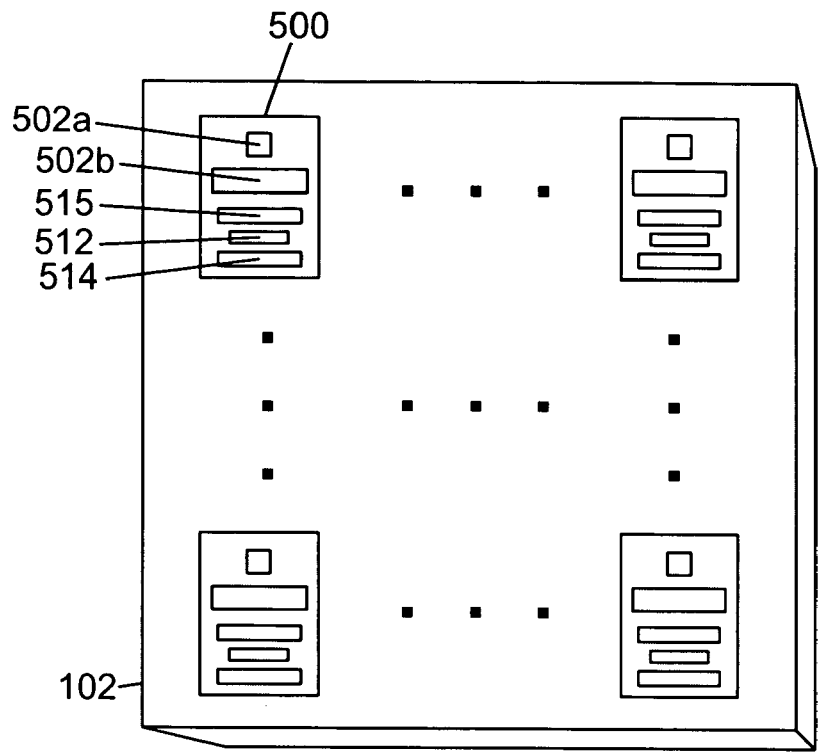
FIG. 5 is a diagram illustrating a second embodiment of a read/write mechanism.

FIG. 5 is a diagram illustrating a second embodiment of read/write mechanism 106 for use with the longitudinal magnetic storage medium 200b shown in FIG. 3b. In this embodiment, read/write mechanism 106 includes read/write device 500. Read/write device 500 includes a longitudinal magnetic write head with two poles 502a and 502b, a read sensor 512, and a shield pair 514 and 515.

To write information using read/write device 500, current is applied to the coil winding to generate a fringing field between the two poles 502a and 502b to cause information to be written in data layer 312. Write head 502 causes information to be stored in data layer 312 according to the polarity of the fringing field. One polarity causes a first logic state to be stored in data layer 312, and the other polarity causes a second logic state to be stored in data layer 312.

Read sensor 512 causes information to be read from data layer 312. Read sensor 512 may be a magnetoresistive (MR) sensor, a giant magnetoresistive (GMR) sensor, or a magnetic tunnel junction sensor.

Read sensor 512 is sandwiched in between the two shields 514 and 515 as illustrated in FIG. 5 which shows rows and columns of read/write devices 500 in read/write mechanism array 102.

Figure 6:
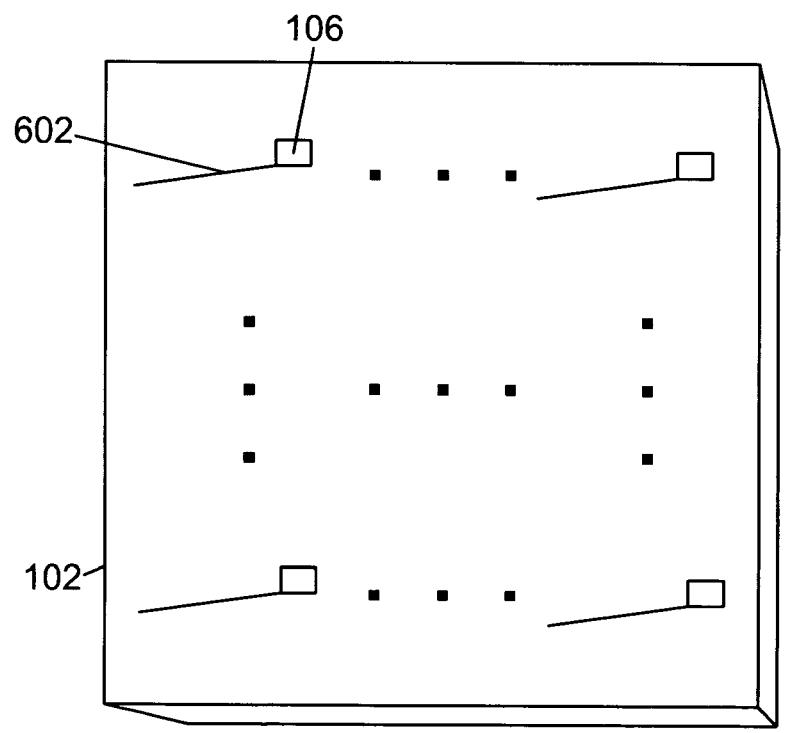
FIG. 6 is a diagram illustrating an alternative embodiment of selected portions of the storage device of FIG. 1.

FIG. 6 is a diagram illustrating an alternative embodiment of selected portions of the storage device of FIG. 1. In the embodiment of FIG. 6, read/write mechanisms 106 are each coupled to one end of a cantilever 602. The other end of each cantilever is coupled to the housing of read/write mechanism array 102. Each cantilever 602 is operable to adjust the distance between its corresponding read/write mechanism 106 and magnetic storage medium 200.

In other embodiments, read/write mechanism array 102 is mounted in a first plane with micromover 104 and magnetic storage medium 200 is mounted in a second plane that is parallel to and in close proximity to the first plane. In these embodiments, micromover 104 moves the read/write mechanism array 102 relative to magnetic storage medium 200 similar to the embodiments described above.

The above embodiments may offer advantages over previous storage devices. For instance, high storage densities may be achieved because of the relatively small bit size on both perpendicular and longitudinal magnetic storage media. In addition, the embodiments may offer increase reliability because no or relatively little aerodynamics may be involved with micromovers. Further, micromovers may consume less power than components of previous storage devices.

What is claimed is:

1. A storage device comprising:
a magnetic storage medium mounted in a first plane;
a write mechanism mounted in a second plane that is parallel to the first plane and configured to write information to the magnetic storage medium; and
a micromover configured to move the magnetic storage medium in a first direction parallel to the first plane and configured to move the magnetic storage medium in a second direction parallel to the first plane and perpendicular to the first direction;
wherein the magnetic storage medium comprises a perpendicular medium having a storage location, and wherein the write mechanism is configured to set an orientation of magnetization of the storage location in a third direction that is perpendicular to the first plane to cause the information to be written to the magnetic storage medium.

2. The storage device of claim 1 further comprising a read mechanism mounted in the second plane.

3. The storage device of claim 2 wherein the read mechanism comprises a magnetoresistive sensor.

4. The storage device of claim 2 wherein the read mechanism comprises a giant magnetoresistive sensor.

5. The storage device of claim 2 wherein the read mechanism comprises a magnetic tunnel junction sensor.

6. The storage device of claim 1 wherein the write mechanism comprises a write pole, a magnetic flux return pole, and a coil configured to produce magnetic flux in the write pole to set the orientation of magnetization of the storage location.

7. The storage device of claim 1 wherein the first plane is in close proximity to the second plane.

8. The storage device of claim 7 wherein the plurality of read/write mechanisms are arranged in an array of rows and columns in the second plane.

9. The storage device of claim 1 further comprising a cantilever coupled to the write mechanism.

10. The storage device of claim 1 wherein the magnetic storage medium includes a data layer and a magnetically soft layer mounted on a substrate.

11. A storage device comprising:
a magnetic storage medium mounted in a first plane;
a plurality of read/write mechanisms mounted in a second plane that is parallel to the first plane, wherein each of the plurality of read/write mechanisms is configured to write information to the magnetic storage medium and read information from the magnetic storage medium; and
a micromover configured to move the magnetic storage medium in a first direction parallel to the first plane and configured to move the magnetic storage medium in a second direction parallel to the first plane and perpendicular to the first direction;

wherein the magnetic storage medium comprises a longitudinal medium having a plurality of storage locations, and wherein each of the plurality of read/write mechanisms is configured to set an orientation of magnetization of at least one of the plurality of storage locations in at least a third direction that is parallel to the first plane to write information to the magnetic storage medium.

12. The storage device of claim 11 wherein the magnetic storage medium includes a data layer mounted on a substrate.

13. The storage device of claim 11 wherein each of the plurality of read/write mechanisms includes a coil winding and a plurality of poles configured to form a fringing field that is configured to set the orientation of magnetization of at least one of the plurality of storage locations in response to a current applied to the coil winding.

14. A storage device comprising:
a magnetic storage medium mounted in a first plane;
a means for writing information to the magnetic storage medium, the means mounted in a second plane that is parallel to the first plane; and
a micromover configured to move the magnetic storage medium in a first direction parallel to the first plane and configured to move the magnetic storage medium in a second direction parallel to the first plane and perpendicular to the first direction;
wherein the magnetic storage medium comprises a perpendicular medium having a storage location, and wherein the means for writing the information is for setting an orientation of magnetization of the storage location in a third direction that is perpendicular to the first plane to cause the information to be written to the magnetic storage medium.

15. The storage device of claim 14 further comprising a read mechanism mounted in the second plane.

16. The storage device of claim 15 wherein the read mechanism comprises a magnetoresistive sensor.

17. The storage device of claim 15 wherein the read mechanism comprises a giant magnetoresistive sensor.

18. The storage device of claim 15 wherein the read mechanism comprises a magnetic tunnel junction sensor.

19. The storage device of claim 14 wherein the means for writing the information includes a means for producing magnetic flux to set the orientation of magnetization of the storage location.

20. The storage device of claim 14 wherein the magnetic storage medium includes a data layer and a magnetically soft layer mounted on a substrate.

21. A method comprising:
providing a magnetic storage medium mounted in a first plane;
providing a write mechanism mounted in a second plane that is parallel to the first plane and configured to write information to the magnetic storage medium; and
providing a micromover configured to move the magnetic storage medium in a first direction parallel to the first plane and configured to move the magnetic storage medium in a second direction parallel to the first plane and perpendicular to the first direction;
wherein the magnetic storage medium comprises a longitudinal medium having a storage location, and wherein the write mechanism is configured to set an orientation of magnetization of the storage location in a third direction that is parallel to the first plane to write the information to the magnetic storage medium.

22. The method of claim 21 further comprising:
providing a read mechanism mounted in the second plane.

23. The method of claim 21 wherein the magnetic storage medium includes a data layer mounted on a substrate.

24. The method of claim 21 wherein the write mechanism includes a coil winding and a plurality of poles configured to form a fringing field that is configured to set the orientation of magnetization of the storage location in response to a current applied to the coil winding.

* * * * *

UNITED STATES PATENT AND TRADEMARK OFFICE
CERTIFICATE OF CORRECTION

| | | |
|---|---|---|
| PATENT NO. | : 7,038,878 B2 | Page 1 of 1 |
| APPLICATION NO. | : 10/695567 | |
| DATED | : May 2, 2006 | |
| INVENTOR(S) | : Lung T. Tran et al. | |

It is certified that error appears in the above-identified patent and that said Letters Patent is hereby corrected as shown below:

On the title page, item (75), in "Inventors", in column 1, line 2, delete "Andrew Van" and insert -- Andrew L. Van --, therefor.

Signed and Sealed this

Twenty-third Day of June, 2009

JOHN DOLL
*Acting Director of the United States Patent and Trademark Office*